(12) United States Patent
Phipps et al.

(10) Patent No.: US 7,432,817 B2
(45) Date of Patent: Oct. 7, 2008

(54) MODULE WITH RFID TAG AND ASSOCIATED BRIDGE ANTENNA

(75) Inventors: William Phipps, Fairport, NY (US); Alberto Rodriguez, Webster, NY (US); Scott J. Bell, Rochester, NY (US); Heiko Rommelmann, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 376 days.

(21) Appl. No.: 11/388,043

(22) Filed: Mar. 23, 2006

(65) Prior Publication Data

US 2007/0222606 A1   Sep. 27, 2007

(51) Int. Cl.
G08B 13/14 (2006.01)
H04Q 5/22 (2006.01)
G06F 19/00 (2006.01)
G06K 19/06 (2006.01)

(52) U.S. Cl. ............... 340/572.7; 340/572.1; 340/572.8; 340/571; 340/568.1; 340/10.1; 235/385; 235/386; 235/492

(58) Field of Classification Search ............... 340/572.1, 340/572.7, 572.8, 568.1, 10.1, 571; 235/385, 235/492

See application file for complete search history.

(56) References Cited

U.S. PATENT DOCUMENTS 4,872,022 A   10/1989   Schock (Continued)

FOREIGN PATENT DOCUMENTS

DE   299 18 297 U1   2/2000

(Continued)

OTHER PUBLICATIONS

European Search Report, May 29, 2007.

(Continued)

*Primary Examiner*—George A Bugg
*Assistant Examiner*—Lam P Pham
(74) *Attorney, Agent, or Firm*—Wiggin and Dana LLP

(57) ABSTRACT

An RFID bridge antenna is positioned between a tag antenna associated with a tag and a reader antenna associated with a reader. The bridge includes at least two RF antenna elements spaced apart from one another and coupled together by an electrical conductor. The first RF antenna element is located proximate to the tag antenna and the second RF antenna element is located proximate to the reader antenna. An electromagnetic carrier signal transmitted by the reader antenna is received by one of the RF antenna element and retransmitted to the tag antenna by the other RF antenna element, increasing the distance over which the tag can communicate with the reader. Where the tag is attached to a packaged object, the RFID bridge antenna may be included in the package to allow wireless data communication between the tag and a reader. The reader may also be located external to the package. For example, one of the RF antenna elements may be attached to a label on the package, allowing data stored in the tag to be extracted by the external reader. The object may be a module, also known as a customer replaceable unit (CRU), and the tag may be configured as a customer replaceable unit monitor (CRUM). The module may take the form of a container having a closure cap equipped with a tag and the container may be stored in a cabinet along with an RFID bridge antenna mounted on the cabinet door to establish data communication between the tag and a reader.

9 Claims, 8 Drawing Sheets

U.S. PATENT DOCUMENTS

| | | | |
|---|---|---|---|
| 5,640,169 A | 6/1997 | Weaver | |
| 6,016,409 A | 1/2000 | Beard et al. | |
| 6,351,621 B1 | 2/2002 | Richards et al. | |
| 6,377,764 B1 | 4/2002 | Morris-jones | |
| 6,563,425 B2 * | 5/2003 | Nicholson et al. | 340/572.7 |
| 6,724,308 B2 * | 4/2004 | Nicholson | 340/572.1 |
| 6,879,876 B2 * | 4/2005 | O'Dougherty et al. | 700/231 |
| 7,075,437 B2 * | 7/2006 | Bridgelall et al. | 340/572.1 |
| 7,126,479 B2 * | 10/2006 | Claessens et al. | 340/572.1 |
| 7,152,781 B2 * | 12/2006 | O'Dougherty et al. | 235/376 |
| 7,327,264 B1 * | 2/2008 | Mitchell et al. | 340/572.7 |
| 7,342,501 B2 * | 3/2008 | Abbott | 340/572.8 |
| 2003/0214774 A1 | 11/2003 | Locatelli et al. | |
| 2005/0127155 A1 | 6/2005 | Claessens | |
| 2005/0264422 A1 * | 12/2005 | Watanabe et al. | 340/572.7 |
| 2006/0208899 A1 * | 9/2006 | Suzuki et al. | 340/572.7 |
| 2007/0222603 A1 * | 9/2007 | Lai et al. | 340/572.7 |
| 2007/0222604 A1 * | 9/2007 | Phipps et al. | 340/572.7 |
| 2007/0262850 A1 | 11/2007 | Wilgert | |

FOREIGN PATENT DOCUMENTS

| | | |
|---|---|---|
| FR | 1 361 359 A1 | 11/2003 |
| WO | WO 00/22673 A1 * | 4/2000 |
| WO | WO 02/095675 A1 * | 11/2002 |
| WO | WO 2005/08180 A1 * | 9/2005 |
| WO | WO 2006/004484 A1 * | 1/2006 |

OTHER PUBLICATIONS

European Search Report, dated May 9, 2008.*

* cited by examiner

MODULE WITH RFID TAG AND ASSOCIATED BRIDGE ANTENNA

BACKGROUND

A common trend in machine design, particularly in the office equipment industry, is to organize a machine on a modular basis, wherein certain distinct subsystems of the machine are bundled together into modules which can be readily removed from the machine and replaced with new modules of the same or similar type. A modular design facilitates great flexibility in the business relationship with the customer. By providing subsystems in discrete modules, also known as "customer replaceable units" or CRUs, visits from a service representative can be made very short, since all the representative has to do is remove and replace a defective module. Actual repair of the module may take place remotely at the service provider's premises. Further, some customers may wish to have the ability to buy modules "off the shelf," such as from an equipment supply store. Indeed, it is possible that a customer may lease the machine and wish to buy a supply of modules as needed. Further, the use of modules, particularly for expendable supply units (e.g., copier and printer toner bottles) are conducive to recycling activities.

In order to facilitate a variety of business arrangements among manufacturers, service providers, and customers, it is known to provide these modules with electronically-readable memory devices, also known as "customer replaceable unit monitors" or CRUMs, which, when the module is installed in the machine, enable the machine to both read information from the CRUM and also write information to the CRUM. The information read from, or written to, the CRUM may be used by the machine to perform various functions. For example, U.S. Pat. No. 6,016,409 entitled "System For Managing User Modules in a Digital Printing Apparatus", which is incorporated by reference herein in its entirety, describes various data that may be stored in a CRUM and various functions that may be performed using this data.

The use of CRUMs in a machine requires that the machine include a means for communicating data between the CRUMs and the control circuitry resident in the machine. This may be accomplished wirelessly. For example, U.S. Pat. No. 6,377,764 issued Apr. 23, 2003 and entitled "Method and Apparatus for Communication, Without A Solid Medium, Among Control Boards in a Printing Apparatus," which is incorporated by reference herein in its entirety, describes a digital printing apparatus in which one or more modules has a board therein, which is able to communicate with another board within the apparatus by infrared or other wireless communication. In another example, U.S. Pat. No. 6,351,621 to Richards et al., describes a printer or copier having a removable module, such as a marking material supply module or a marking device module, that is provided with a CRUM. The non-volatile memory of the CRUM is accessed through a wireless interface, such as a radio frequency identification (RFID) system, which is also associated with the module. The memory can be accessed, through wireless means, either by the printer or copier itself or by an external device.

Wireless identification systems (e.g., RFID systems) typically include two sub-assemblies: a tag (also known as a transponder) and a reader (also known as an interrogator, transceiver, or coupler). The tag is typically attached to an object, and includes, among other components, an antenna and an integrated circuit (IC) device. Stored within the IC device is information related to the object to which the tag is attached. While this information usually includes identification data for the object, it may include other information related to, or used by, the object (e.g., tracking information, usage information, computer code, etc.). For example, the object may be a CRU and the tag may be a CRUM.

In operation, the antenna on the tag receives incoming data signals superimposed on a modulated carrier signal, which is provided by an antenna on the reader. In response to the incoming data signals, the tag superimposes data from the IC device onto the carrier signal by changing its own circuit impedance. In some tags, known as passive tags, the carrier signal is used to provide operating power for the tag. In other tags, known as active tags, at least some of the operating power for the tag is provided by a source other than the carrier signal (e.g., a battery).

The reader forms an interface between the tag and a host such as a computer. The reader generally includes an integrated circuit chip and associated circuitry that allows it to communicate with both the tag and the host computer. Typically, there is a predefined command set used by the host computer to control the reader, which passes the commands to the tag via the modulated carrier signal. The reader generates the modulated carrier signal to transmit data to the tag, and receives data from the tag by detecting the loading effects of the tag on the carrier signal.

Any given tag and reader combination will communicate data over a limited distance. For example, an RFID system that conforms to International Standards Organization (ISO) Standard 14443-2B (13.56 mega-Hertz (MHz)) is ideal for communicating over distances of between 0 millimeters (mm) to 30 mm. If a system is designed to operate in the 10 mm to 20 mm range, it is unlikely this system will work in the 40 mm to 50 mm range. Problematically, it is unlikely that the designed communication range can be maintained at every desired point of access (e.g., during production, packaging, shipping, and installation). For example, when a CRU having an attached CRUM is packaged for shipping or storage, the distance between the CRUM within the package and a reader external to the package may be greater than the designed operating range. As a result, the CRUM must be removed from the package to place the reader close enough for data communication between the CRUM and reader.

BRIEF SUMMARY

According to one aspect, there is provided a radio frequency identification (RFID) bridge antenna for increasing a distance over which a tag can communicate with a reader or coupler. Basically, the bridge antenna comprises at least two radio frequency (RF) antenna elements spaced apart from one another and coupled together by an electrical conductor. The first of the two RF elements is located proximate to the reader antenna and the second RF element is located proximate to the tag antenna. An electromagnetic carrier signal generated by the reader is transmitted to the first RF antenna element and is then passed through the conductor to the second RF element, bridging the gap between the tag and reader antennas and increasing the distance over which the tag can communicate with the reader.

In another aspect, there is provided a machine, such as a printing apparatus, containing at least one customer replaceable module or CRU, such as a printing ink cartridge or toner bottle, the module having a CRUM or tag associated therewith for wirelessly communicating data with a reader. The machine includes a RFID bridge antenna for extending the distance over which the tag can communicate with the reader. The bridge antenna includes a local RF antenna element positioned proximate to the reader antenna and a remote RF antenna element positioned proximate to the tag antenna. The two RF antenna elements are coupled together by a conductor of sufficient length to bridge the gap between the tag and reader antennas and thus enable communication between both the tag and reader over a distance that would otherwise not be possible.

In another aspect, there is provided a package for storing an object having a tag associated therewith for wirelessly communicating data with a reader, wherein the object is placed in a remote location inside the package. An RFID bridge antenna is positioned inside the packaged for extending the distance over which the tag can communicate with the reader. The bridge antenna comprises a local RF antenna coil positioned proximate to the reader antenna and a remote RF coil positioned proximate to the tag antenna. An electromagnetic carrier signal generated by the reader is transmitted by the reader antenna to the local RF coil, this signal being then carried by an electrical conductor to the remote RF antenna coil proximate to the tag antenna. The signal is then retransmitted via the tag antenna to the tag, covering an overall distance which is significantly greater than would ordinarily be possible without the bridge antenna. Although the electrical conductor can be a simple open wire lead, it is preferred that the two RF antenna elements be electromagnetically coupled together using a flexible, low-loss, shielded co-axial cable or coax.

In another aspect, there is provided a package for storing multiple objects having a tag associated with more than one of the objects for wirelessly communicating data with a single reader, wherein at least one of the objects is remotely located inside the package. In this case, the reader is provided with at least one reader antenna arranged so as to transmit an electromagnetic carrier signal to multiple tags associated with the objects. The tags communicate directly with the reader using a single RFID bridge antenna or a series of bridge antennas wirelessly communicating with a tag associated with at least one of the objects, the bridge antenna or antennas increasing the distance over which the tag or tags can communicate with the reader. The reader may be located either inside or outside of the package.

In still another aspect, there is provided a machine, such as a printing apparatus, including a case or cabinet having a hingeably mounted door providing access for storage of at least one consumer replaceable module or CRU, such as a bottle containing a printing material, (e.g. liquid ink), the bottle having a CRUM or tag including a tag antenna associated therewith for wirelessly communicating data to a reader. The module or CRU is remotely located inside the case or cabinet and has its tag antenna in close proximity to the door when the door is closed. An RFID bridge antenna is mounted to the inner side of the door, such that when the door is closed, one of its two RF antenna coils is placed in close proximity to the container or bottle and its tag while the other RF coil is placed in close proximity to the reader also inside the case or cabinet. In this aspect, the bridge antenna utilizes the door as a co-planar, non-conductive substrate to increase the distance or gap over which the tag can communicate with a reader. Also, in this aspect, since both of the bridge antenna coils lie within the same plane on the inner side of the door, the antenna coils can be advantageously incorporated onto a single substrate such as a PC board, eliminating the need for a flexible cable or coax such as may be required in order to make connection between antenna elements that may lie in different planes.

In yet another aspect, there is provided a PC board having a substantially flat planar surface on which is mounted an electrical circuit including an RFID bridge antenna comprising at least two RF antenna coils spaced apart a distance from each other and connected together by an electrical conductor. The conductor may be a substantially flat, low-loss, open wire conductor similar to a twin lead TV cable embedded within the surface of the PC board.

In yet another aspect, there is provided a method for increasing the distance over which a tag can communicate with a reader comprising providing a bridge antenna including at least two RF antenna elements, placing the two RF antenna elements in spaced apart relation, one in proximity to the reader and the other in proximity to the tag, providing an electrical conductor of sufficient length to extend across the gap between the tag and the reader and electrically connecting the two RF antenna elements together using the conductor, thereby increasing the distance over which the tag can communicate with the reader.

BRIEF DESCRIPTION OF THE DRAWING

Referring now to the drawings, which are exemplary embodiments, wherein like items are numbered alike.

DETAILED DESCRIPTION

Figure 1:
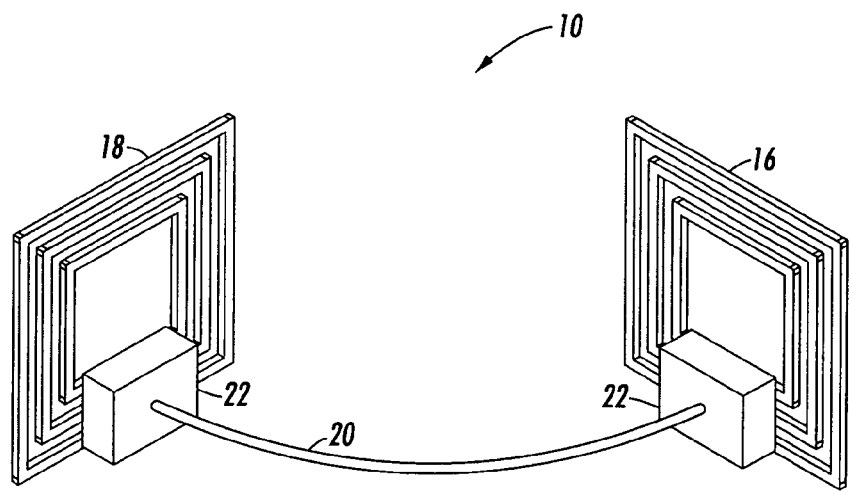
FIG. 1 is a perspective view of an RFID bridge antenna including a pair of RF antenna elements.
Figure 2:
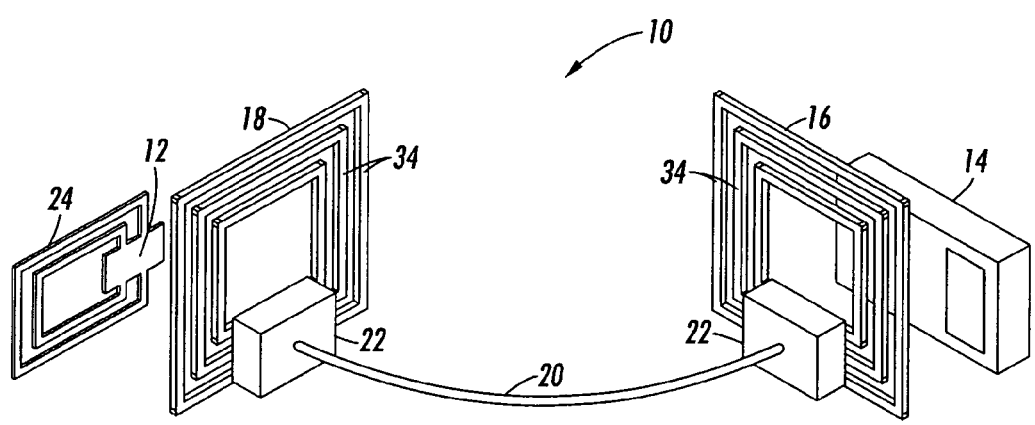
FIG. 2 is a similar view of an RFID bridge antenna disposed between a reader and a tag antenna.
Figure 3:
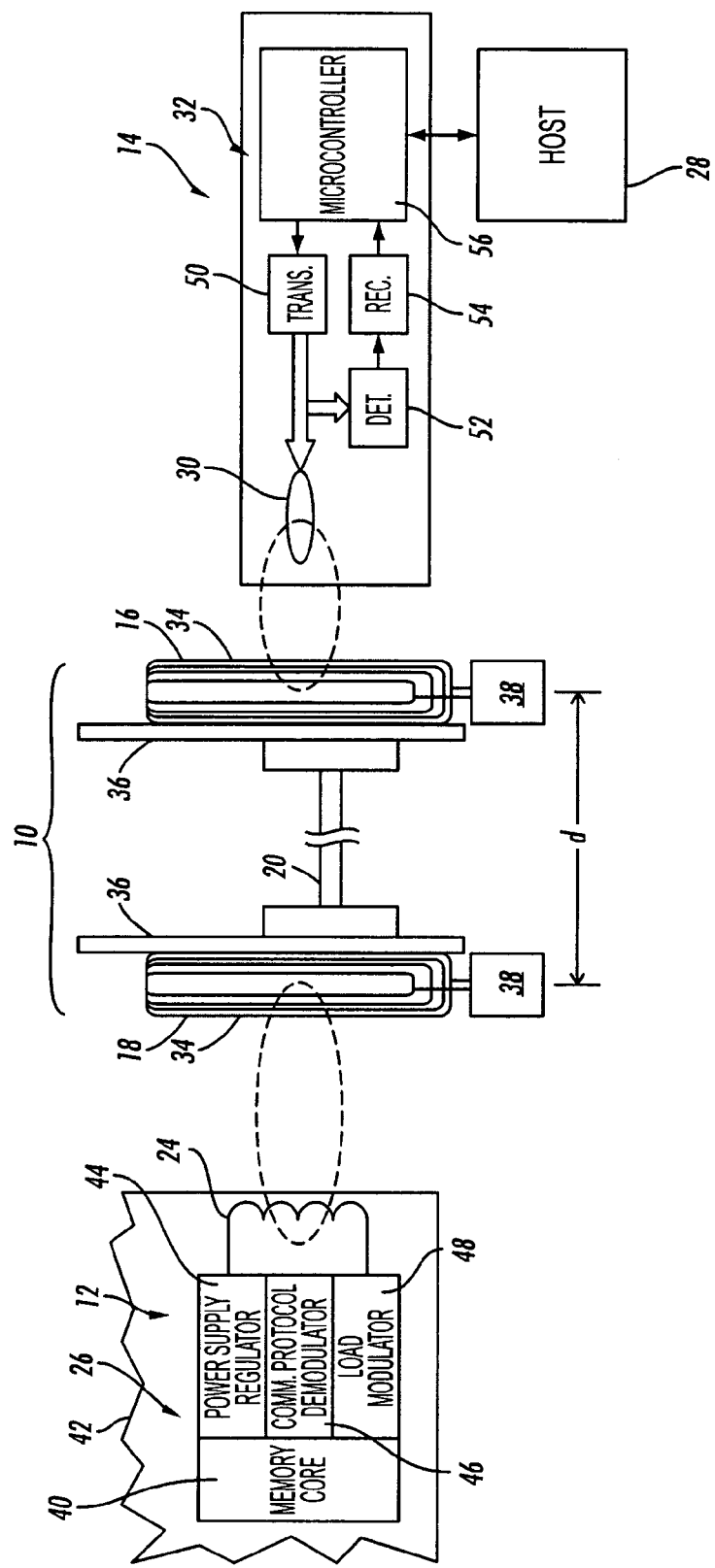
FIG. 3 is a schematic view of the tag, the reader and the RFID bridge antenna, showing each in greater detail.

Referring to FIGS. 1-3, there is shown the basic structure of an RFID bridge antenna 10 for increasing a distance over which a tag (also known as a transponder) 12 can communicate with a reader (also known as an interrogator, transceiver, or coupler) 14. As shown in FIG. 1, the bridge antenna 10 comprises two RF antenna elements or coils 16 and 18 spaced apart from one another and electrically coupled together by an electrical conductor 20. As shown in more detail in FIG. 2, one of the RF coils 16 is located proximate to the reader 14 while the other RF coil 18 is located proximate to the tag 12. The conductor 20 is preferably a flexible, low loss, shielded co-axial cable, such as a 50 ohm coax, for example, and is connected to the base of each RF coil 16, 18 using a conventional coaxial terminals 22. The tag 12 is typically attached to an object (not shown), and includes a tag antenna 24 and an integrated circuit (IC) device 26 (see FIG. 3). Stored within the IC device 26 is information related to the object to which the tag 12 is attached. While this information usually includes identification data for the object, it may include other information related to, or used by, the object, as will be described in further detail hereinafter. It is contemplated that the object to which the tag 12 is attached may be any tangible item. In one embodiment, described hereinafter with respect to FIG. 9, the object includes a replaceable module for a machine, also referred to as a CRU (Customer Replaceable Unit), and the tag 12 is configured as a CRUM (Customer Replaceable Unit Monitor).

As shown in greater detail in FIG. 3, the reader 14 forms the interface between the tag 12 and a host processor (e.g., a computer) 28. The reader 14 generally includes a reader antenna 30, an integrated circuit device 32, and other associated circuitry that allows the reader 14 to communicate with both the tag 12 and the host processor 28. Typically, there is a predefined command set used by the host processor 28 to control the reader 14, which passes the commands to the tag 12 via a modulated, electromagnetic carrier signal transmitted from the reader antenna 30. The reader 14 generates the modulated carrier signal to transmit data to the tag 12, and receives data from the tag 12 by detecting loading effects of the tag 12 on the carrier signal.

As used herein, a reader is any device that generates a modulated, electromagnetic carrier signal to be received by a tag, and receives data from the tag by detecting loading effects on the carrier signal. Similarly, a tag is any device that receives a modulated, electromagnetic carrier signal transmitted by a reader and superimposes data onto the carrier signal by load variation.

The RFID bridge antenna 10 is positioned between the tag antenna 24 and the reader antenna 30 such that the RF antenna coil 16, also referred to herein as the "local coil", receives the modulated electromagnetic carrier signal transmitted by the reader antenna 30. The carrier signal is conveyed through the electrical conductor 20 and is received by the other RF antenna coil 18, also referred to herein as the "remote coil", where the signal is then transmitted to the tag antenna 24. The bridge antenna 10 thus allows wireless data communication between the tag 12 and the reader 14 at distances "d" greater than that which would not be possible without the RFID bridge antenna 10.

The two RF antenna coils 16, 18 may each be formed from one or more loops (turns) 34 of conductive material suitably disposed on a substrate 36, and may include a charge storage element (e.g., a capacitor) 38 electrically connected across the loops 34. The loops 34 and the charge storage element 36 are adhered to, imbedded in, or otherwise attached to the substrate 36. It is also contemplated that the RFID bridge antenna 10 may be formed from one or more loops 34 without the charge storage element 38.

The substrate 36 may be formed from any convenient material. For example, the substrate 36 may be formed from a printed circuit board, plastic, paper, cardboard, nylon, and the like. As will be described in further detail hereinafter, the substrate 36 may form part of a package to allow data communication between a tagged item disposed in the package and a reader external to the package.

The loops 34 of conductive material may be formed using any convenient means. For example, the loops 34 may be formed from one or more wires or from a stamped or etched conductive material (e.g., a metal or metal alloy) attached to the substrate 36. It is also contemplated that the loops 34 may be formed from an electrically conductive ink applied to the substrate 36. The ink may be applied using any conventional method, such as spraying, screening, painting, and the like. For example, the electrically conductive ink may include any of a number of thermosetting or thermoplastic highly conductive silver inks manufactured by Dow Corning Corporation of Midland, Mich. Advantageously, the use of a conductive ink to form the loops 34 allows the bridge antenna 10 to be applied to any number of different surfaces. It is also believed that the use of a conductive ink to form the loops 34 will reduce the cost of the bridge antenna 10 to below that possible where the loops 34 are formed from a wire or etched conductive trace.

The charge storage element 38 may be formed from a surface-mounted device (e.g., an SMT capacitor) attached to the substrate 36. Alternatively, the charge storage element 30 may also be formed along with the loops 34 as part of a stamping or etching process (e.g., formed from a metallic trace). It is also contemplated that the charge storage element 38 may be formed on the substrate 36 along with the loops 34 by the application of the conductive ink.

As best shown in FIG. 3, the loops 34 of the RFID bridge antenna 10 extend in a plane defined by the substrate 36. The tag antenna 24 and reader antenna 30 may be similarly formed as generally planar loop antennas. In the embodiment shown, the two bridge antenna coils 16, 18 are each positioned so as to face the tag antenna 24 and the reader antenna 30, respectively, in a generally spaced apart, parallel relation such that the off-plane orthogonal axis of the antenna coils 16, 18 is generally aligned with those of the tag antenna 24 and reader antenna 30. However, as depicted in both FIGS. 1 and 2, the two bridge antenna coils 16, 18 may be off-set at most any angle desired in either a horizontal or vertical plane owing to the flexible properties of the conductor or coaxial cable 20. This is a decided advantage of the RFID bridge antenna enabling its use in extending the distance or gap over which the reader 14 may communicate with a tag 12 in many different applications. For example, it is possible with the bridge antenna for a reader 14 to communicate with a tag 12 attached to an object that is placed at a distant or remote location inside a package wherein the flexible cable connecting the two coils 16, 18 is able to follow, in some cases, a tortuous path between and/or around other objects in the package.

Preferably, the two RFID bridge antenna coils 16, 18 are coupled together electromagnetically by a low radiation loss conductor 20, such as a shielded coaxial cable (e.g. a 50 ohm coax) and should both resonate at substantially the same frequency in order maximize transmission efficiencies between the two RF antenna elements. The two coils 16, 18 should also be tuned to approximately the same resonate frequencies as the tag and reader antennas 24, 30, respectively. The tag and reader antennas 24, 30 as well as the two coils 16, 18 may all be tuned by employing a charge storage element 38 (e.g. a capacitor) of such value as to substantially equal the inductive reactance of the coils and thus cause the antennas to resonate at the desired frequency. The antennas may also be tuned by changing the number of loops or turns 34, and/or by changing the cross-sectional area of the conductive material forming the loops 34.

In the embodiment of FIG. 3, the tag 12 is depicted as a passive radio-frequency identification (RFID) tag, which communicates data by way of electromagnetic field coupling between the tag antenna 24 and the remote RF coil 18 of the bridge antenna 10. Within the tag 12, data storage and processing as well as radio frequency (RF) communications functions are typically performed by one or more integrated circuit chips 26. For example, the tag 12 may include: a memory core (e.g., an EEPROM) 40, which stores data associated with an object 42 (e.g., a module or CRU) to which the tag 12 is attached; a power supply regulator 44, which rectifies and otherwise conditions alternating current induced in the tag antenna 24 by the time-varying RF carrier signal provided by the reader antenna 30 for use in the tag as a direct current power source; and receiver/emitter modules 46 and 48 (e.g., compatible with the ISO 14443 standard) for demodulating and decoding incoming data from the received RF signal and superimposing outgoing data on the RF signal by load variation, respectively.

While FIG. 3 depicts a passive RFID tag, it is also contemplated that the tag 12 may include an active or partially active RFID tag, which uses a battery (e.g., a thin power source) to provide all or part of the operating power for the tag 12.

The reader 14 includes a transmitter 50 that generates the time-varying RF signal transmitted by the reader antenna 30. As a result of electromagnetic coupling between the tag antenna 24 and the reader antenna 30, a portion of the RF signal transmitted by the tag antenna 24 enters the reader antenna 30 and is separated from the transmitted signal by a detector (e.g., an envelope detector) 52. The separated signal is passed to a receiver 54, where it is amplified, decoded and presented via a microcontroller 56 to the host processor 28.

With the RFID bridge antenna 10 connected between the tag antenna 24 and the reader antenna 30 as shown in FIG. 3, an electromagnetic RF carrier signal generated by the reader 14 is transmitted by the reader antenna 30 and is received by the local RF coil 16 of the bridge antenna 10. Assuming the transmission line provided by the cable 20 is balanced, that is, the load impedance equals the characteristic impedance of the cable (e.g. 50 ohms), the conductor will act as if it were infinitely long and the RF signal that appears at the opposite end of the cable, namely at the remote RF coil 18, will be of substantially equal strength as compared to the input signal. In other words, there should be little if any loss of signal if the transmission line is correctly terminated, regardless of the length of the cable 20. It has been determined that this use of a low loss cable 20 in the RFID bridge antenna 10 allows the tag 12 to be powered by the carrier signal transmitted by the reader antenna 30 at distances greater than that which would be possible without the bridge antenna 10, thus allowing wireless data communication between the tag 12 and the reader 14 at these greater distances. Indeed, it has been determined that the RFID bridge antenna 10 can more than double the range over which the tag 12 and reader 14 can communicate. Typically, the separation between the tag and reader in ordinary applications (i.e., without the bridge antenna 10) has been about 5 mm to 30 mm and in some cases up to 100 mm. It has been shown, however, that a high enough degree of efficiency can be achieved with the bridge antenna 10 such that a remote tag can communicate with a reader over a distance as much as 600 mm from the tag.

Figure 4:
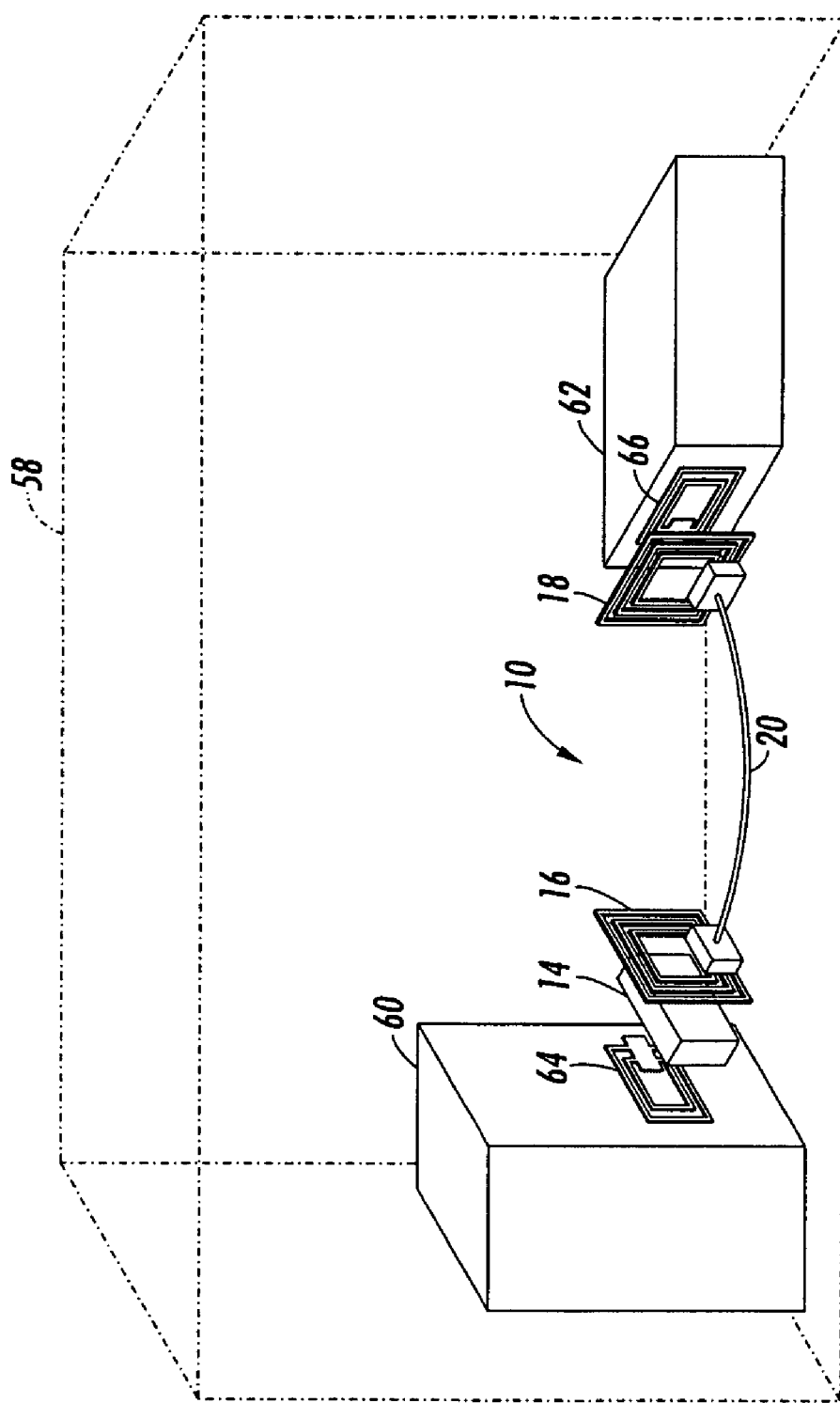
FIG. 4 is a perspective view of a package containing multiple objects provided with individual CRU tags communicating with a single reader inside the package using at least one bridge antenna.

FIG. 4 shows an embodiment in which the RFID bridge antenna 10 is employed as an extension of the reader or coupler 14. In this case, a single reader 14 is placed inside an enclosure 58 together with two objects 60, 62, each of which is positioned at a distant or remote location from each other, for example, at opposite ends of the enclosure. The enclosure 58 may be a shipping package or a machine, such as a printing apparatus, and the objects may be consumables, such as ink cartridges, or more generally customer replaceable units, CRUs. The objects 60 and 62 each have a separate tag 64 and 66, respectively, which contain electronic data identifying the objects. The reader 14 is placed proximate to one of the objects 60 and receives data relative to that object directly from its tag antenna 64. The reader 14 also receives data from the tag 66 relative to the object 62 by means of the RFID bridge antenna 10. As shown, the bridge antenna 10 has its local antenna coil 16 positioned proximate to the reader 14 while its other remote coil 18 is placed proximate to the tag 66 on the remote object 62. The reader 14 receives this data via the signal carried from one coil to the other by the flexible cable 20, extending the distance over which the tag 76 can communicate with the reader 14. The bridge antenna 10 may be supported by any suitable means such as by using supporting substrates 36 for each of the coils 16, 18 as shown in FIG. 3. For simplicity, the reader antenna 30 is not shown in the view of FIG. 4. It will be seen then that the RFID bridge antenna greatly enhances the utility of the reader or coupler 14 in communicating with both tags 64, 66. The RFID bridge antenna, in this case, is an "extension" of the reader or coupler 14. This is possible because the coupling efficiency that can be achieved with the bridge antenna is easily high enough to power a remote tag 66. It should also be noted that the bridge antenna makes possible the use of only one reader or coupler in installations where two or more tags or objects are involved. This approach would be considerably less expensive and require considerably less software complexity than having a second coupler in the package or machine.

Figure 5:
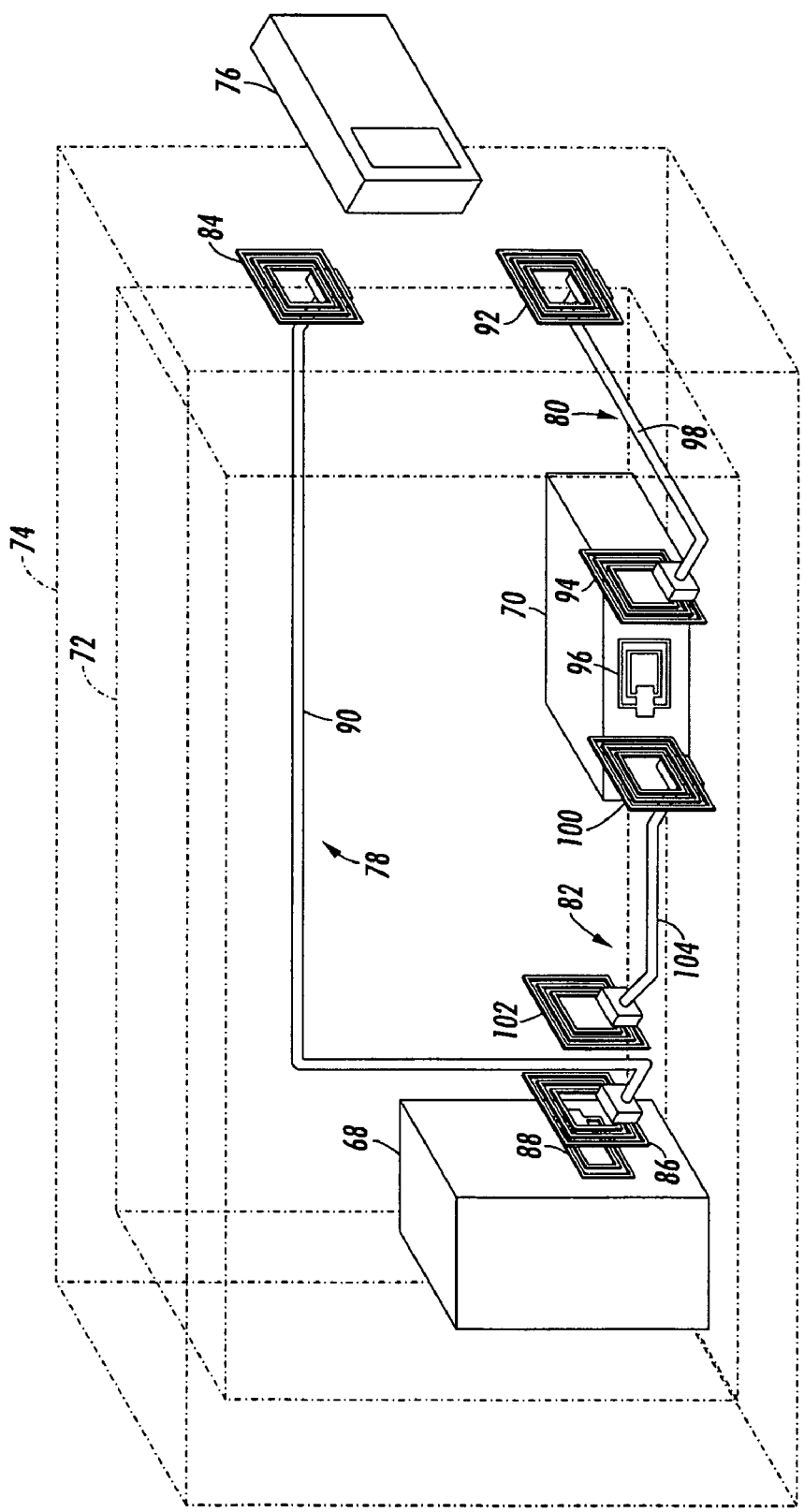
FIG. 5 is a perspective view of a package or machine containing multiple objects or modules provided with CRU tags at least one of which objects or modules is located in a remote location inside the machine or package and wherein the tags communicate with a single reader located outside the package or machine.

FIG. 5 depicts a more complicated installation of multiple RFID bridge antennas for obtaining data relative to multiple objects or CRUs positioned inside separate enclosures. In the illustrated installation, two objects or CRUs 68, 70 are shown placed inside an inner enclosure 72 (shown in phantom) which may be a machine, such as a printing apparatus, for example, the inner enclosure 72 being contained within an outer enclosure 74 (also shown in phantom) which may be a shipping carton for the machine. Ordinarily, with the present state of the art, it would be extremely difficult, if not impossible, to obtain data relative to these objects 68, 70 using a reader or coupler 76 that is external to the outer package 74. In this case, however, obtaining such data is made possible through the use of either one of two separate RFID bridge antennas 78, 80 and optionally a third bridge antenna 82. The first bridge antenna 78 has its local antenna coil 84 attached to the exterior surface of the outer enclosure 74 and its remote coil 86 positioned proximate to the tag 88 mounted on the remote object or CRU 68. The two coils 84, 86 are coupled electromagnetically by the shielded, flexible cable or coax 90. The second bridge antenna 80 has its local antenna coils 92 also attached to the exterior surface of the outer enclosure 74 while its remote antenna coil 94 is positioned proximate to the tag 96 mounted on the other object or CRU 70. The object 70 is located closer to the external reader 76 but in a more remote position with respect to the object 68. The two coils 92, 94 are coupled together by the shielded, flexible cable or coax 98. Optionally, the third RFID bridge antenna 82 has one of its antenna coils 100 also positioned proximate to the tag 96 mounted on the object 70 while its other antenna coil 102 is positioned proximate to both the tag 88 on the remote object 68 and the antenna coil 86 of the first bridge antenna 78. The two antenna coils 100, 102 are similarly coupled electromagnetically by the flexible cable or coax 104.

At any time during shipping, storage or use of the objects 68, 70, data relative to the two objects may be received by placing the reader 76 in close proximity to either one of the RF antenna coils 84, 92 on the surface of the outer enclosure 74. When placed next to the antenna coil 84, the reader 76 can receive data stored in the tag 88 relative to the object 68 via the first RFID bridge antenna 78 and, in a separate operation, it can also receive data stored in the tag 96 relative to the object or CRU 70, via the third RFID bridge antenna 82. In a similar fashion, the reader 76 can receive data stored in the tag 96 relative to the object 70 when placed next to the antenna coil 92 and, in a separate operation, it can also receive data stored in the tag 88 relative to the object 68 also via the third bridge antenna 82. It is possible with this same arrangement to link a number of tags together using multiple bridge antennas in series to greatly extend the distance over which a single reader can communicate with multiple tags attached to objects remotely dispersed inside a package or machine. Many other RFID bridge antenna arrangements aside from those illustrated in FIGS. 4 and 5, including those using bridge antennas in parallel, are possible as will readily occur to those skilled in the art.

Although not shown in FIG. 5, the bridge antenna coils may be supported by any suitable means such as by mounting them on substrates as shown in FIG. 3, by printing them on labels or by embedding the coils in PC board material, for example. The two external mounted antenna coils 84, 92 for the two bridge antennas 78, 80 used in the installation of FIG. 5 can be suitably imprinted on labels which are then affixed to the surface of the outer enclosure 74 which may be a package or carton. They can also be printed directly onto the outer surface of the same package or carton.

As used herein, a label includes any identifying or descriptive marker that may be attached to an object. For example, the label may include a packaging label, which includes text or other visual information relating to a package or carton.

The antenna coils used in a typical RFID bridge antenna may generally conform to the ISO Standard 14443-2B requirements and will usually resonate at about 13.5 $MH_z$, for example. Such a resonate antenna coil can be made using a standard antenna wire about 100 centimeters long having a cross-section of about 1 mm, coiled into 6 substantially rectangle shaped loops, spaced about 0.7 centimeters apart, and including a capacitor connected across the loops of a value between about 0 and 120 pF. The two RF antenna elements which make up the RFID bridge antenna are each positioned relatively close to the respective tag and reader antennas during operation of the RFID system, typically from about 5 to about 20 mm, for example. However, with the RFID bridge antenna in place, separation between the tag and coupler has been significantly increased to distances of from about 50 to about 300 mm.

As illustrated in FIG. 5, one or more RFID bridge antennas 78, 80 may be used to allow data communication between tags 88, 96 secured to objects 68, 80 disposed in an enclosure or package and a reader 76 that is external to the enclosure. In these installations, the bridge antennas 78, 80 are positioned between the tags 88, 96 and the reader 76 to increase the data communication range between the tags and the reader. As a result, data communication between the tags and reader can take place through the enclosure or package, without having to remove the objects.

As used herein, a package includes any container in which something is packed for storage or transportation. While FIG. 5 depicts the package 74 as a box, it is contemplated that the package may include anyone or more of: an envelope, a wrapper, a pallet, a carton, a can, a jar, a tray, a trunk, a sleeve, a cargo container, and the like.

Figure 6:
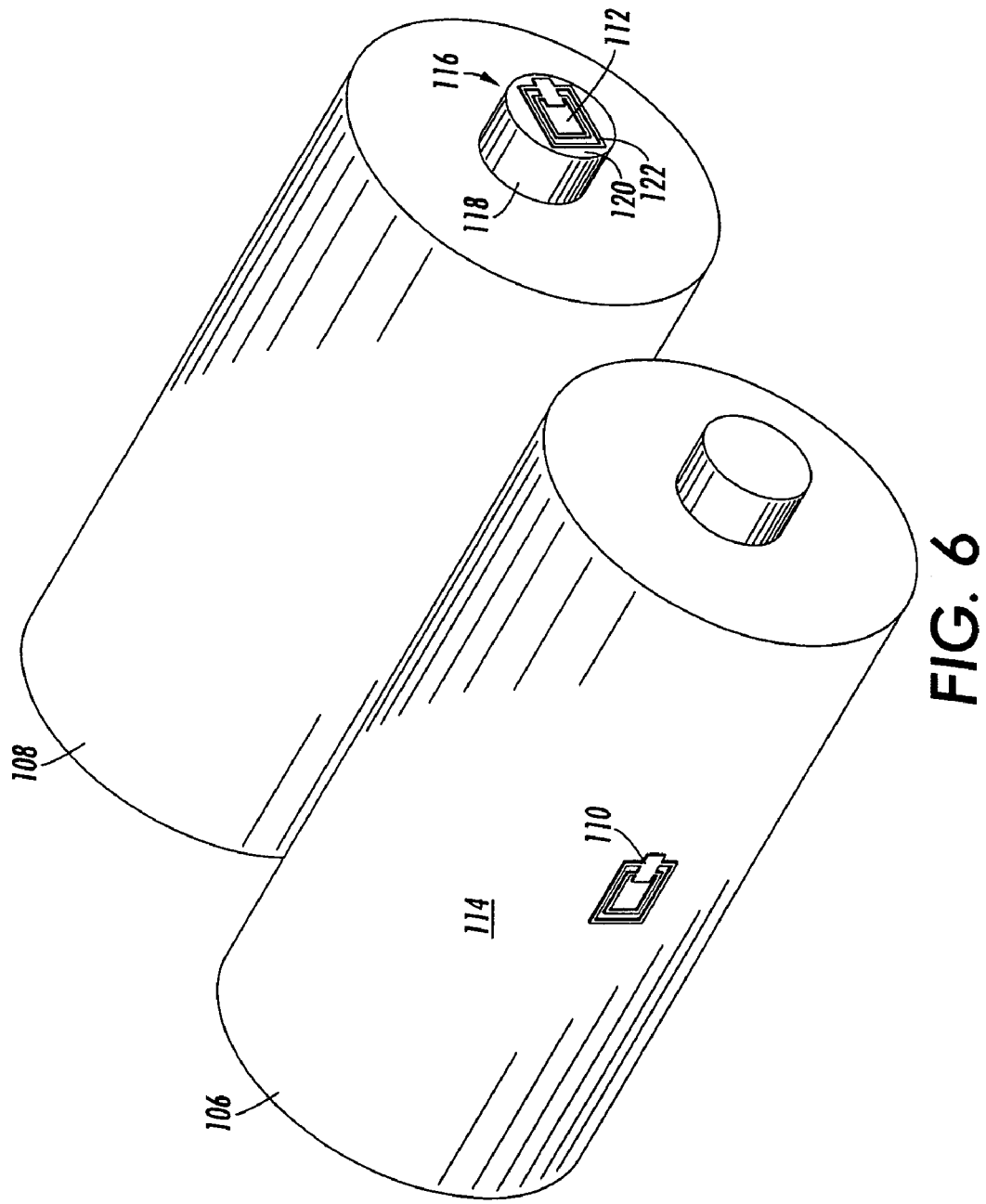
FIG. 6 is a perspective view of a pair of containers or bottles each provided with a CRU tag, one located on the side wall of the container or bottle and the other located within the top of a closure cap.

FIG. 6 shows a pair of cylindrical containers or bottles 106, 108, suitable for packaging a liquid product, such as ink, for example, wherein each container is provided with a tag 110, 112, respectively. In one case, the tag 110 is affixed to the side wall 114 of the container 106 while in the other case, the tag 112 is affixed to a removable cap 116. The cap 116 itself is of a conventional design having generally cylindrical side walls 118 and a generally flat top surface 120. The tag 112 including its associated tag antenna 122 is affixed, imbedded or imprinted on the top surface 120 of the cap 116

The ink container 106 is generally used or stored in a separate compartment within a printing machine along with its tag 110 which being on the side wall 114 of the container 106, is generally inaccessible and must be removed from the compartment before any data relative to the ink product can be ascertained using a reader. This problem is essentially avoided when using the container 108 equipped with a cap 116 having a tag 112 affixed to its top surface 120 as shown in FIG. 6. Since, in most cases, the container 108 is stored either standing or resting on its side, the cap 116 with its tag 112 is readily exposed and easily accessible to a reader or coupler.

Figure 7:
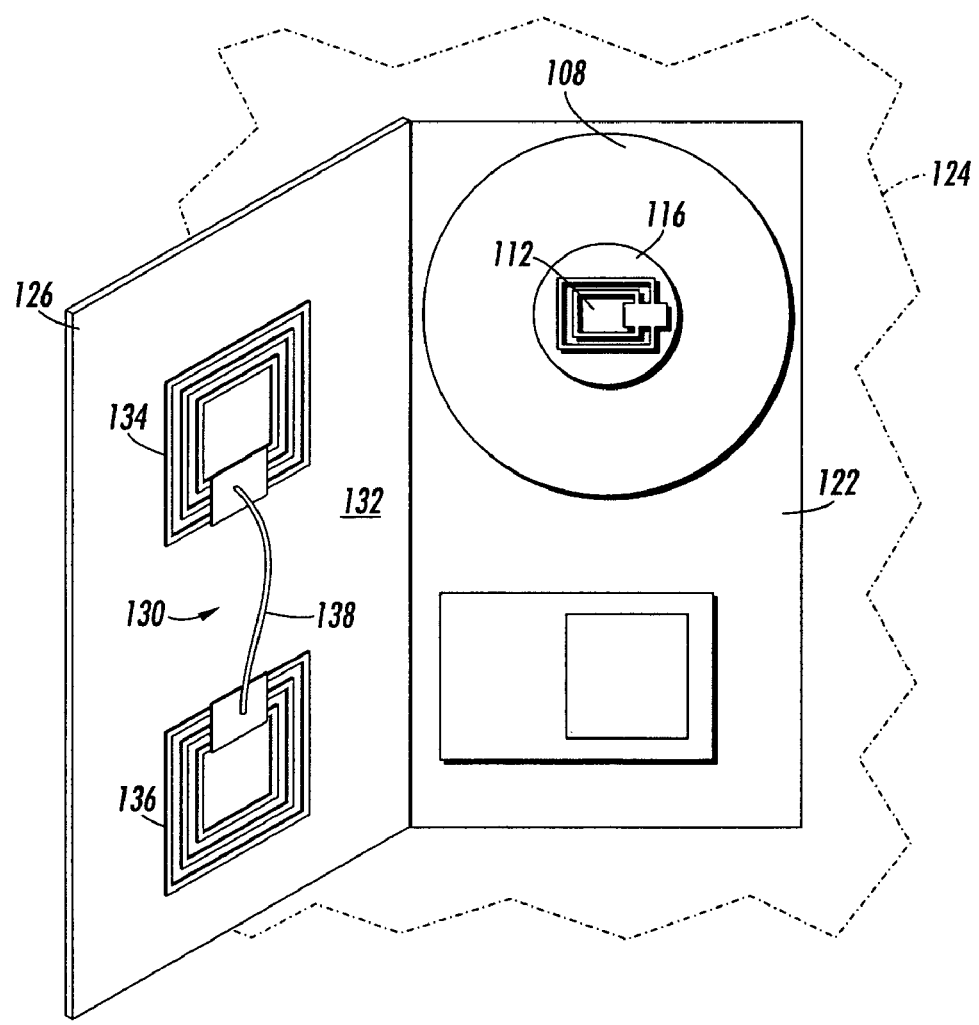
FIG. 7 is a perspective view of a storage cabinet for a machine, such as a printing apparatus, including supply modules, such as ink bottles having a closure cap of the type shown in FIG. 6, wherein the cabinet has a hinged door, the inner side of which is provided with an RFID bridge antenna for bridging the gap over which a reader inside the cabinet can communicate with the tag on the closure cap.

Such an arrangement is shown in FIG. 7 wherein the ink container 108 is stored on its side within the storage area 122 of a cabinet or printing machine, for example. The storage area 122 is basically defined by a framework, indicated generally at 124, and includes a flat panel door 126 which is hingeably mounted to the framework 124. When the door 126 is swung open as shown in FIG. 7, the cap 116 and associated tag 112 are easily accessible, permitting communication with the tag 112 using a portable reader or coupler, for example. However, as also shown in FIG. 7, a reader 128 may be mounted inside the storage area 122, for instance, in a position just below the ink container 108. In this embodiment, the reader 128 communicates with the tag 112 through the use of an RFID bridge antenna 130 mounted onto the inner side 132 of the door 126. The bridge antenna 130 comprises two antenna coils 134, 136 suitably affixed to the inner side 132 of the door 126. The two coils 134, 136 are mounted in spaced apart, co-planar relation on the door and are connected together by a flexible cable or coax 138. The antenna coils 134, 136 are spaced apart a sufficient distance from one another such that they generally align themselves with the tag 112 and the reader 128, respectively, when the door 126 is closed. The bridge antenna 130 may be affixed to the inner surface 132 of the door 126 by any suitable means such as by gluing directly to the door or by imprinting the antenna coils onto an insulating substrate which is then attached to the door 126.

Figure 8:
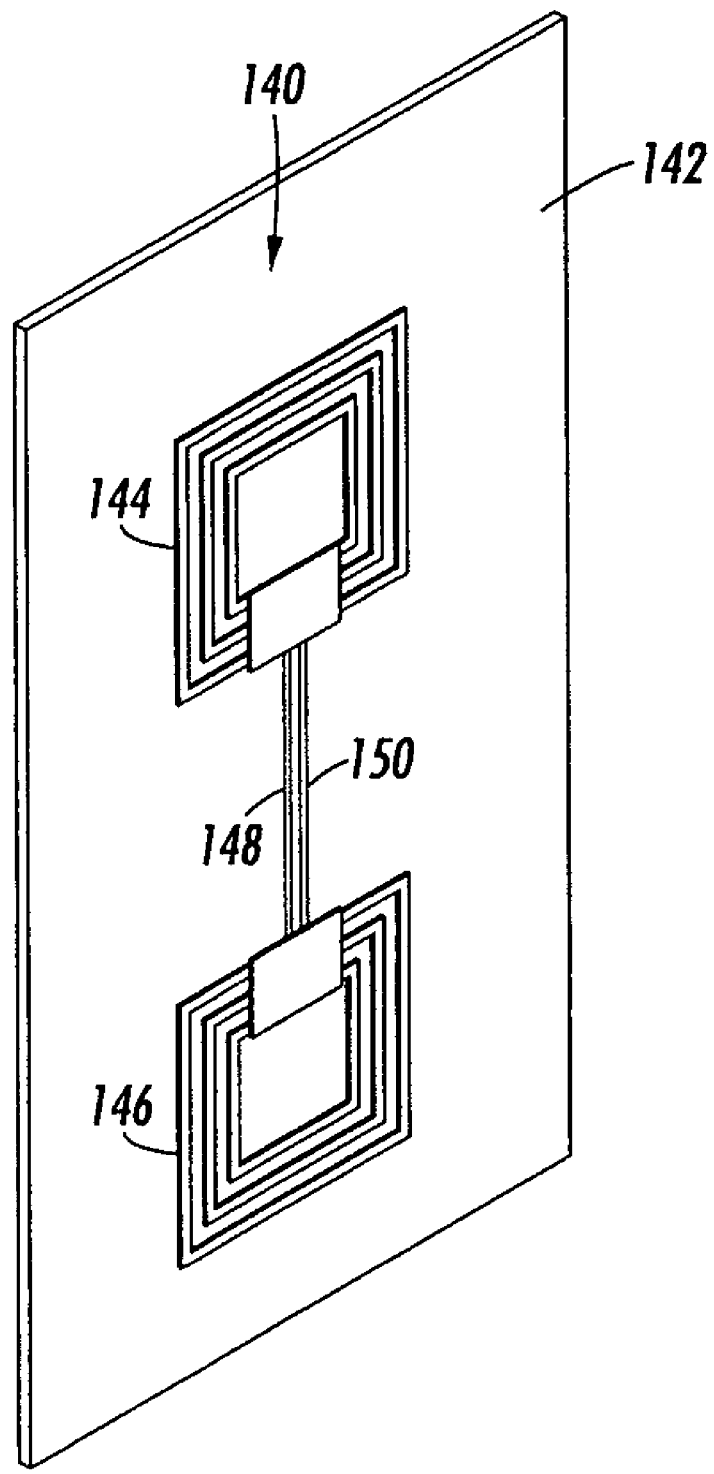
FIG. 8 is a plan view of a PC board having an RFID bridge antenna embedded within its surface including a low loss twin lead conductor for connecting the two RF antenna elements or coils together.

FIG. 8 shows an embodiment of an RFID bridge antenna 140 wherein the substrate is an electrically non-conductive or insulating PC board 142. The bridge antenna 140 has two coils 144, 146 imbedded or printed onto the flat planar surface of the board 142. The coils 144, 146 are positioned in the same spaced apart relation but, in this instance, the coils are connected together by two separate or spaced apart, flat, narrow, electrically conductive strips 148, 150 which are also imbedded, printed or otherwise incorporated onto the surface of the PC board 142. In this embodiment, the two strips 148, 150 together constitute a low loss, open twin lead transmission line similar to conventional twin lead TV cable which can be easily incorporated into a PC board by conventional methods. The two strips 148, 150 transmit RF signals between the two coils 144, 146 which are electrically substantially 180 degrees out of phase with one another and thus effectively cancel any radiation losses that may occur. This concept of imbedding or printing an open RF transmission line directly onto a PC board for transmitting RF signals from an RF omponent on a PC board is believed to have many useful advantages in the electronic field aside from its use in the instant RFID bridge antenna.

The use of low loss, open twin lead transmission line in an RFID bridge antenna such as illustrated in FIG. 8, for example, is acceptable in implementations conforming to International Standards organization (ISO) Standard 1443-2B at about 13.56 Mega-Hertz (MHz) for communicating data over distances of up to about 30 mm. However, at higher frequencies, it may be more suitable to employ "strip line" as the transmission conductor in the RFID bridge antenna.

It should also be noted that the RFID bridge antenna disclosed herein is not limited to the use of only two RF antenna elements such as shown in FIGS. 1 and 2 and may incorporate other types of antenna assemblies such as a "Y" configuration, for example. The difficulty with these more elaborate bridge antenna configurations is that if impedance matching so that the use of devices such as a circulator may be called for particular at the higher frequency regimes t hat may be contemplated.

Figure 9:
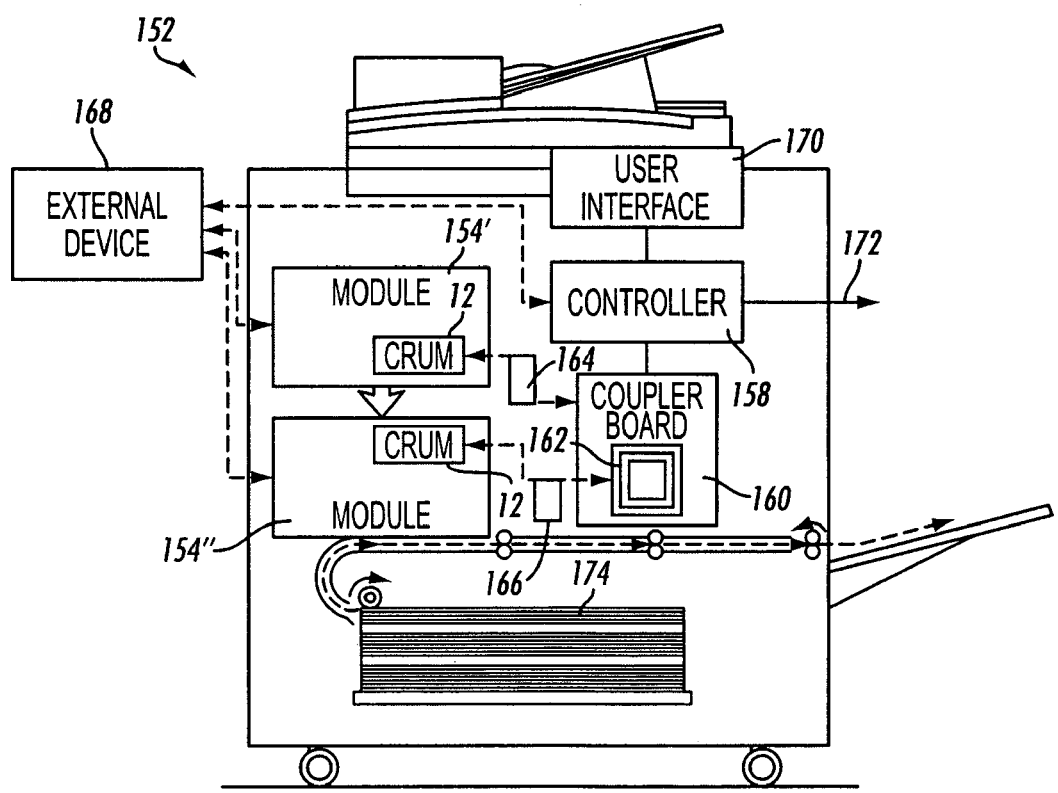
FIG. 9 is a schematic view of a machine, such as a printing apparatus, including customer replaceable units (CRUs) with tags (CRUMs) wherein an RFID bridge antenna is advantageously employed to enable communication between the tags and a reader.

As used herein, an object includes any tangible item to which a tag 12 may be attached. As previously noted, the object may include a replaceable module for a machine. For example, FIG. 9 is a schematic depiction of a machine 152 including replaceable modules 154' and 154", also known as "Customer Replaceable Units" or CRUs. Attached to each of the modules 154' and 154" is a tag 12, which is configured as a CRUM (Customer Replaceable Unit Monitor). The memory core in each CRUM (tag) 12 retains data relevant to the identification, function, and performance of the respective module 154' or 154". Because it includes a non-volatile memory, the CRUM 12 can act as a "scratch pad" for retaining the data stored therein, which travels with the replaceable modules 154' and 154", even when the modules are not installed in the machine 152.

The operation of the machine 152 is generally controlled by a controller 158, which may include one or more microprocessors, application-specific integrated circuits (ASICs), or other signal processing devices encoded with instructions to operate the machine 152. When the modules 154' and 154" are installed in the machine 152, data is communicated between the CRUMs 12 and the controller 158 via a reader (coupler board) 160 having a reader antenna 162, which operates in a similar manner to the reader 14 described herein above. Communication between each of the CRUMs 12 is made possible, in this instance, by the two RFID bridge antennas, indicated by blocks 164, 166, interposed between each CRUM 12 and the coupler board 160, via its antenna 162, in a manner similar to that illustrated in FIG. 4, for example. In addition, data may be communicated between a device 168 external to the machine 152 and one or both of the modules 154' and 154" and the controller 158. Controller 158 may also communicate with users through a user interface 170 or through a network connection 172, such as over phone lines or the Internet.

For purposes of discussion herein, the machine 152 is depicted as a printing apparatus, such as a digital printer of the ink jet or "laser" (electrophotographic or xerographic) variety, or a digital or analog copier, and the modules 154' and 154" are depicted as including hardware devices related to printing (printing hardware), such as a marking material supply module and a marking device module, respectively. It is contemplated, however, that the machine 152 may be any electrical, electronic, mechanical, electromechanical device configured to perform one or more functions, and the modules 154' and 154" may be any component, group of components, system, or subsystem of the machine 152. The word "printer" as used herein encompasses any apparatus, such as a digital copier, bookmaking machine, facsimile machine, multi-function machine, etc. which performs a print outputting function for any purpose.

In the embodiment of FIG. 9, sheets on which images are to be printed are drawn from a stack 174 and move relative to the marking device module 154", where the individual sheets are printed upon with desired images. The marking material for placing marks on various sheets by marking device module 154" is provided by marking material supply module 154'. If machine 152 is an electrostatographic printer, marking material supply module 154' may include a supply of toner, while marking device module 154" may include any number of hardware items for the electrostatographic process, such as an image receptor (photoreceptor) or fusing device. In the well-known process of electrostatographic printing, the most common type of which is known as "xerography," a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finally divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate, such as paper from the stack 174, and the image affixed thereto to form a permanent record of the image.

In the ink-jet context, the marking material supply module 154' includes a quantity of liquid or solid ink, and may include separate tanks for different primary-colored inks, while marking device module 154" includes a printhead. In either the electrostatographic or ink-jet context, "marking material" can include other consumed items used in printing but not precisely used for marking, such as oil or cleaning fluid used in a fusing device. Of course, depending on a particular design of a machine 152, the functions of modules 154' and 154" may be combined in a single module, or alternatively, the marking device may not be provided in a easily replaceable module such as 154". Further, there may be provided several different marking material supply modules 154', such as in a full color printer. In general, it is contemplated that the machine may include one or more replaceable modules, and it is expected that, at multiple times within the life of machine 152, one or more of these modules need to be removed or replaced. In the current market for office equipment, for example, it is typically desirable that modules such as 154' and 154" be readily replaceable by the end user, thus saving the expense of having a representative of the vendor visit the user.

There are many different types of data that can be stored in the tag or CRUM 12. For example, U.S. Pat. No. 6,016,409 issued Jan. 18, 2000 and entitled "System For Managing User Modules in a Digital Printing Apparatus", which is incorporated by reference herein in its entirety, describes various data that may be stored in a CRUM and various functions that may be performed using this data. Advantageously, using the RFID bridge antenna 10 in the manner described with reference to FIGS. 3-9 allows this data to be read from, or written to the CRUM 12 from a distance further than would otherwise be possible without the bridge antenna. With the embodiments of FIGS. 3-7 this data can be read from, or written to the CRUM 12 when the modules 154 are packaged for delivery or storage. Depending on the data stored in the CRUM 12, this could be used in many useful ways.

For example, the CRUM 12 could retain a serial number of the particular module. Using the RFID bridge antenna 10, identification of the packaged module by the serial number can be determined by the reader 14 without having to remove the module from the package, for example. Also, the serial number as read by the reader 14 can be used to verify authenticity of the module, thereby identifying any counterfeit modules packaged in authentic packages. The serial number as read by the reader 14 can also be useful for inventory tracking, batch identification, and the like.

In other types of CRUM systems, the CRUM 12 can further act as an "odometer" to maintain a cumulative count indicating use of the module. For example, where the module is to be used with a printing apparatus, the count may indicate the number of prints which have been output using the particular module. Using the RFID bridge antenna 10, this count may be read from a packaged module to determine whether the module is new or refurbished. Similarly, the CRUM 12 may store one or more threshold values (e.g., maximum number of prints, etc.) against which the count is compared to determine the health of the module. Using the RFID bridge antenna 10, these threshold values may be read from or written to the CRUM 12 using the reader 14 while the module remains packaged.

Another type of data which may be stored in a particular location in the non-volatile memory of the CRUM 12 may relate to specific performance data associated with the module, so that the module can be operated in an optimal, or at least advisable, manner. For instance, in the ink jet context, it is known to load data symbolic of optimal voltage or pulse width in the CRUM 12, so that the particular module may be optimally operated when the module is installed. In the xerographic context, it is known to load into a CRUM module specific data such as relating to the tested transfer efficiency of toner from a photoreceptor to a print sheet: This information is useful for an accurate calculation of toner consumption. Using the bridge antenna 10, this performance data may be read from or written to the CRUM 12 using the reader 14 while the module remains packaged.

Other types of data which may be included in the non-volatile memory in CRUM 12 include one or more serial numbers of machines, such as printers, in which the particular module has been installed. This may be useful for tracing faults in the module or among a population of machines. Also, if the particular module is intended to be remanufactured, another useful piece of data to be loaded into the memory can be the date of the last remanufacture of the module, as well as a code relating to some detail of the remanufacture, which may be symbolic of, for instance, a location of the remanufacture, or the specific actions that were taken on the module in a remanufacturing process. Again, the RFID bridge antenna 10 allows this information to be read from or written to the CRUM 12 using the reader 14 while the module remains packaged.

In yet another example, referring again to FIG. 9, other types of data which may be included in the non-volatile memory in the CRUM 12 are used by the controller 158 to configure machine 152 option attributes for enabling or disabling various optional features of the machine or module. These option attributes may be associated with a particular user of the machine (e.g., permissions provided to a person using the copier) or may be associated with the machine in general (e.g., speed and/or voltage settings associated with the country in which the machine is used, optional features available under a sales contract or lease associated with the machine, etc.). Examples of these optional features may include but are not limited to: device/machine speed; machine stand alone mode or network connected mode; scanning enabled; scan to email; scan to Internet Fax; network server Fax enabled; job based accounting; etc. Other data that may be stored in the CRUM may include software updates, settings updates, and the like that are used by the controller 158. The bridge antenna 10 allows data communication between the CRUM 12 and the reader 14 while the module is in the package, thus allowing any of this data to be read from or written to the CRUM 12 without removing the module from the package 58, 74. Advantageously, this allows generic modules to be manufactured and packaged, with the CRUMs 12 of these generic modules later being programmed for particular applications as they are needed.

It should be understood that any of the features, characteristics, alternatives or modifications described regarding a particular embodiment herein may also be applied, used, or incorporated with any other embodiment described herein.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A cabinet for storage of at least one container having a tag associated therewith, said tag including a tag antenna coupled to an integrated circuit device having data related to a product stored in said container, said cabinet comprising, in combination:

a framework defining a storage area having an opening, said container being disposed within said storage area with said tag antenna being accessible through said opening, a reader having a reader antenna disposed within said storage area, said reader antenna being accessible through said opening, a panel moveable mounted to said framework for closing said opening, said panel having a an inner side surface facing said opening when said panel is closed, and an RFID bridge antenna mounted to said inner side surface of said panel, said bridge antenna including at least two RF antenna elements coupled together by a conductor, said RF antenna elements being spaced apart and so positioned on said panel as to substantially align themselves one with each one of said tag and reader antennas when said panel is closed, thereby increasing the distance over which said tag can communicate with said reader.

2. The cabinet of claim 1, wherein said conductor is a flexible, low loss coaxial cable.

3. The cabinet of claim 1, wherein said panel is moveably hinged onto said framework.

4. The cabinet of claim 3, wherein said container has a removable cap on which said tag and tag antenna are attached and wherein said container is disposed on its side within said storage compartment exposing said tag antenna though said opening.

5. The cabinet of claim 4, wherein said RFID antenna bridge is attached directly to said inner side surface of said panel.

6. The cabinet of claim 3, wherein said RFID antenna bridge is attached to a substrate and wherein said substrate is secured to said inner side surface of said panel.

7. The cabinet of claim 6, wherein said substrate is a PC board.

8. The cabinet of claim 6, wherein said conductor is a low loss, open twin lead cable and wherein said RFID antenna including said RF antenna elements and said twin lead cable are printed onto the surface of said PC board.

9. The cabinet of claim 5, wherein said framework is part of a printing machine and wherein said container is a storage bottle containing one of: toner, liquid ink, oil and cleaning fluid.

* * * * *